UNITED STATES PATENT OFFICE.

CHRISTOPHER RIS, OF BASLE, SWITZERLAND, ASSIGNOR TO JOHN R. GEIGY & CO., OF SAME PLACE.

BLACK TRISAZO DYE.

SPECIFICATION forming part of Letters Patent No. 599,532, dated February 22, 1898.

Application filed September 11, 1897. Serial No. 651,362. (Specimens.)

*To all whom it may concern:*

Be it known that I, CHRISTOPHER RIS, doctor of philosophy, a citizen of the Republic of Switzerland, residing at Basle, in said Republic of Switzerland, have invented certain new and useful Improvements in Processes of Producing a Black Dyestuff, of which the following is a specification.

My invention refers to the production of a new black trisazo dyestuff, which is obtained by the combination of the tetrazo compound of paraphenylenediaminazobeta$_1$ alpha$_4$ amidonaphthol beta$_3$ sulfo-acid (gamma acid) first in acid solution with one molecule of a metadiamin, such as metaphenylenediamin, and afterward in an alkaline solution with one molecule of beta$_1$ alpha$_4$ amidonaphthol beta$_3$ sulfo-acid.

The new dyestuff possesses the following formula:

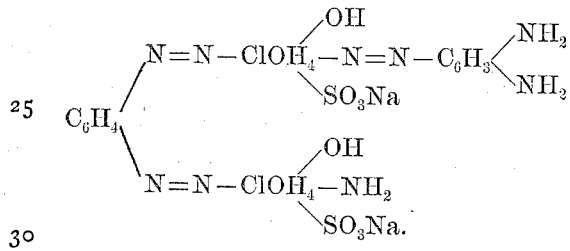

Example: The paraphenylenediaminazobeta$_1$ alpha$_4$ amidonaphthol beta$_3$ sulfo-acid is produced in one of the well-known manners by the saponification of the azo compound obtained by combination of diazotized paraamidoacetanilid with gamma acid or by the partial reduction of the azo compound from diazotized paranitranilin and gamma acid. The tetrazo compound of the saponified azo color from fifteen kilograms of acetparaphenylenediamin and twenty-four kilograms of gamma amidonaphthol-sulfo-acid in acid solution is mixed with a solution of eleven kilograms of metaphenylenediamin and the mass stirred for some hours in order to finish the formation of the intermediary compound. The latter separates in the form of an insoluble black precipitate and the red color of the solution disappears gradually. It shows an acid reaction. Then it is introduced in a solution of twenty-four kilos of beta$_1$ alpha$_4$ amidonaphthol beta$_3$ sulfo-acid (gamma acid) with thirty-six kilograms of sodium carbonate in about five hundred liters of water. Then the mass is heated to 60° to 80° centigrade and the coloring-matter is filtered off and dried. Instead of eleven kilograms of metaphenylenediamin there may also be used twelve kilograms of metatoluylenediamin. The first combination with the metadiamin can be carried out in a solution containing a mineral acid, such as sulfuric acid, hydrochloric acid, or an organic acid, such as acetic acid.

The coloring-matter forms a black powder soluble in water with black color, which by means of reduction becomes colorless. It is soluble in concentrated sulfuric acid with dark-blue color and scarcely soluble in alcohol. It dyes unmordanted cotton, wool, and silk in deep-black shades of great intensity. Cotton shades are faster to soap than most of the direct dyeing cotton colors.

Having thus described my invention, I claim as new and desire to secure by Letters Patent—

1. The process herein described of producing a new black trisazo color, which consists in combining the tetrazo compound of paraphenylenediaminazobeta$_1$ alpha$_4$ amidonaphthol beta$_3$ sulfo-acid first in acid solution with one molecule of a metadiamin, (such as metaphenylenediamin,) and then in alkaline solution with one molecule of beta$_1$ alpha$_4$ amidonaphthol beta$_3$ sulfo-acid, substantially as set forth.

2. The black coloring-matter, obtained by combining the tetrazo compound of paraphenylenediaminazobeta$_1$ alpha$_4$ amidonaphthol beta$_3$ sulfo-acid first with metadiamin and then with beta$_1$ alpha$_4$ amidonaphthol beta$_3$ sulfo-acid, and having the following characteristics: being a black powder, soluble in water with black color, forming with reducing agents a colorless solution, soluble in concentrated sulfuric acid with a dark-blue color, scarcely soluble in alcohol, and dyeing unmordanted cotton, wool and silk in deep-black shades, substantially as set forth.

In testimony that I claim the foregoing as my invention I have signed my name in presence of two subscribing witnesses.

CHRISTOPHER RIS.

Witnesses:
GEORGE GIFFORD,
ALFRED NAPFLE.